United States Patent
Ojha

(10) Patent No.: US 11,423,167 B2
(45) Date of Patent: Aug. 23, 2022

(54) SECURE CONTENT LEAKAGE PREVENTION

(71) Applicant: Box, Inc., Redwood City, CA (US)

(72) Inventor: Alok Ojha, Newark, CA (US)

(73) Assignee: Box, Inc.

( * ) Notice: Subject to any disclaimer, the term of this patent is extended or adjusted under 35 U.S.C. 154(b) by 260 days.

(21) Appl. No.: 16/553,149

(22) Filed: Aug. 27, 2019

(65) Prior Publication Data
US 2020/0065510 A1 Feb. 27, 2020

Related U.S. Application Data

(60) Provisional application No. 62/723,314, filed on Aug. 27, 2018.

(51) Int. Cl.
*G06F 21/62* (2013.01)
*G06F 16/11* (2019.01)
(Continued)

(52) U.S. Cl.
CPC .......... *G06F 21/6218* (2013.01); *G06F 16/11* (2019.01); *G06F 21/53* (2013.01);
(Continued)

(58) Field of Classification Search
CPC ............... G06F 21/6218; G06F 21/577; G06F 21/6227; G06F 21/53; G06F 16/11; G06F 2221/034; G06N 20/00; G06N 5/04; G06N 5/022; G06N 5/046; G06Q 10/101; G06Q 50/01; H04L 63/102; H04L 63/107; H04L 63/1416; H04L 63/1466; H04L 63/105;
(Continued)

(56) References Cited

U.S. PATENT DOCUMENTS 9,497,197 B2   11/2016  Kus et al.
9,935,772 B1 *  4/2018  Madisetti .............. H04L 9/0819
(Continued)

OTHER PUBLICATIONS

"Filter Manager Concepts,", dated Apr. 17, 2019.
(Continued)

*Primary Examiner* — Carl G Colin
*Assistant Examiner* — Han Yang
(74) *Attorney, Agent, or Firm* — Vista IP Law Group, LLP

(57) ABSTRACT

Leakage of secure content (e.g., unauthorized dissemination of secure content) is prevented even after a user has downloaded a copy of the secure content. In a content management system, the secure content object is accessible by users who access the secure content by downloading copies. While the downloading of a copy to a user device is permitted, further dissemination is not allowed. To enforce this degree of security, the user downloads a virtual file system that is configured to store a local instance of the secure content object in a secure container of the user device. During ongoing operation of the user device, every data movement operation request associated with the local instance of the secure content object is intercepted. Logic implemented in the downloaded a virtual file system will deny any data movement operation request when a target storage location associated with the data movement operation request is other than a location in the secure container.

17 Claims, 9 Drawing Sheets

(51) Int. Cl.
*G06F 21/53* (2013.01)
*H04L 9/40* (2022.01)
*H04L 67/06* (2022.01)
*H04L 67/55* (2022.01)
*G06N 20/00* (2019.01)
*G06N 5/04* (2006.01)
*G06F 21/57* (2013.01)

(52) U.S. Cl.
CPC ........ *G06F 21/577* (2013.01); *G06F 21/6227* (2013.01); *G06N 5/04* (2013.01); *G06N 20/00* (2019.01); *H04L 63/102* (2013.01); *H04L 63/105* (2013.01); *H04L 63/107* (2013.01); *H04L 63/1416* (2013.01); *H04L 63/1466* (2013.01); *H04L 67/06* (2013.01); *H04L 67/26* (2013.01); *G06F 2221/034* (2013.01)

(58) Field of Classification Search
CPC ....... H04L 63/104; H04L 67/06; H04L 67/26; H04L 67/22
See application file for complete search history.

(56) References Cited

U.S. PATENT DOCUMENTS

| | | | |
|---|---|---|---|
| 2015/0100890 A1* | 4/2015 | Kosmiskas | G06F 3/0484 |
| | | | 715/744 |
| 2016/0321291 A1* | 11/2016 | Malhotra | G06F 12/0891 |
| 2020/0026536 A1* | 1/2020 | Li | G06T 7/0002 |
| 2020/0220928 A1* | 7/2020 | Karande | G06F 9/5016 |

OTHER PUBLICATIONS

"Filter Manager and Minifilter Driver Architecture," dated Apr. 19, 2017, URL: https://docs.microsoft.com/en-us/windows-hardware/drivers/ifs/filter-manager-and-minifilter-driver-architecture.

"Processing I/O Operations," dated Apr. 19, 2017, URL: https://docs.microsoft.com/en-us/windows-hardware/drivers/ifs/processing-i-o-operations.

* cited by examiner

SECURE CONTENT LEAKAGE PREVENTION

CROSS-REFERENCE TO RELATED APPLICATION(S)

The present application claims the benefit of priority to U.S. Patent Application Ser. No. 62/723,314 titled "COLLABORATION SYSTEM SECURITY", filed on Aug. 27, 2018, which is hereby incorporated by reference in its entirety.

FIELD

This disclosure relates to content management systems, and more particularly to techniques for secure content leakage prevention.

BACKGROUND

The proliferation of cloud-based services and platforms continues to increase. Specifically, cloud-based content management services and systems have impacted the way electronically stored information objects (e.g., files, images, videos, etc.) are stored, and has also impacted the way such content objects are shared and managed. One benefit of using such content management systems is the ability to securely share large volumes of content objects among trusted collaborators on a variety of user devices, such as mobile phones, tablets, laptop computers, desktop computers, and/or other devices. For example, a large enterprise with thousands of users (e.g., employees) and many terabytes of content objects might use a cloud-based content management system to efficiently and securely provision content object access to various individual users (e.g., employees) and/or collaborative groups of users (e.g., other employees and/or partners, and/or suppliers, etc.).

In such environments, secure content objects that are stored and managed at the content management system (e.g., in a remote or cloud computing environment) are accessed by various user devices in their respective local computing environments. Users might interact (e.g., view, edit, etc.) directly with the remotely-stored instances of secure content objects from applications (e.g., word processing applications, etc.) running on their respective user devices. As such, so long as there is some mechanism in place at the content management system to manage editing conflicts (e.g., when two collaborators attempt to concurrently edit a file), collaboration over the content objects by multiple users is facilitated while, at the same time, the security of the content objects is tightly managed by the content management system.

In some cases, however, a user might desire to have a local instance of a secure content object on his or her user device. For example, the user may want to interact with the content object using a native application on their user device while being offline (e.g., disconnected from the content management system) for a certain period of time. In response to this need to interact with secure content objects from anywhere and on any user device (i.e., whether or not the user's device is online at that moment), certain capabilities (e.g., sharing protocols, downloading controls, etc.) have been developed to allow downloading a local instance (e.g., a copy) of a secure content object from a remote content management system to as many user devices (e.g., mobile devices) as there are users (e.g., collaborators). Such capabilities include techniques to synchronize changes made to the local instances of the content object with the remote instance of the content object.

Unfortunately, there are no mechanisms to prevent leakage (e.g., further storage) of a secure content object downloaded to a local computing environment to an unsecure area. Moreover, once a secure content object is leaked into any unsecure areas in the local computing environments, the formerly secure content objects might be still further leaked (e.g., distributed maliciously, distributed unwittingly, etc.) to any number of undesired and/or unintended recipients. As merely one example, a secure content object being edited using a native application in a local computing environment might be saved to the local, unsecure file system using a "Save As . . . " operation, and then distributed to the undesired or unintended recipients. As another example, a secure content object being previewed in a browser in a local computing environment might be downloaded to the local, unsecure file system using the download capability of the browser. What is needed is a way to prevent the leakage of secure content objects into unsecure computing environments while still allowing the user to interact over the secure content objects while offline.

SUMMARY

The present disclosure describes techniques used in systems, methods, and in computer program products for secure content leakage prevention, which techniques advance the relevant technologies to address technological issues with legacy approaches. More specifically, the present disclosure describes techniques used in systems, methods, and in computer program products for preventing leakage of secure content objects beyond a predefined secure area of a local computing environment. Certain embodiments are directed to technological solutions for implementing a secure container in a local computing environment to hold local instances of secure content objects.

The disclosed embodiments modify and improve over legacy approaches. In particular, the herein-disclosed techniques provide technical solutions that address the technical problems attendant to detecting and preventing unauthorized transfer of content objects from secure areas to unsecure areas. Such technical solutions involve specific implementations (i.e., data organization, data communication paths, module-to-module interrelationships, etc.) that relate to the software arts for improving computer functionality.

The ordered combination of steps of the embodiments serve in the context of practical applications that perform steps for implementing a secure container in a local computing environment to hold local instances of secure content objects more efficiently by disallowing unsecure write operations on local instances—even when the local computing environment is temporarily offline. As such, techniques for implementing a secure container in a local computing environment to hold local instances of secure content objects overcome long standing yet unsolved technological problems associated with unauthorized transfer of content objects from secure areas to unsecure areas.

Many of the herein-disclosed embodiments for implementing a secure container in a local computing environment to hold local instances of secure content objects are technological solutions pertaining to technological problems that arise in the hardware and software arts that underlie collaboration systems. Aspects of the present disclosure achieve performance and other improvements in peripheral technical fields including (but not limited to) data storage and cybercrime.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
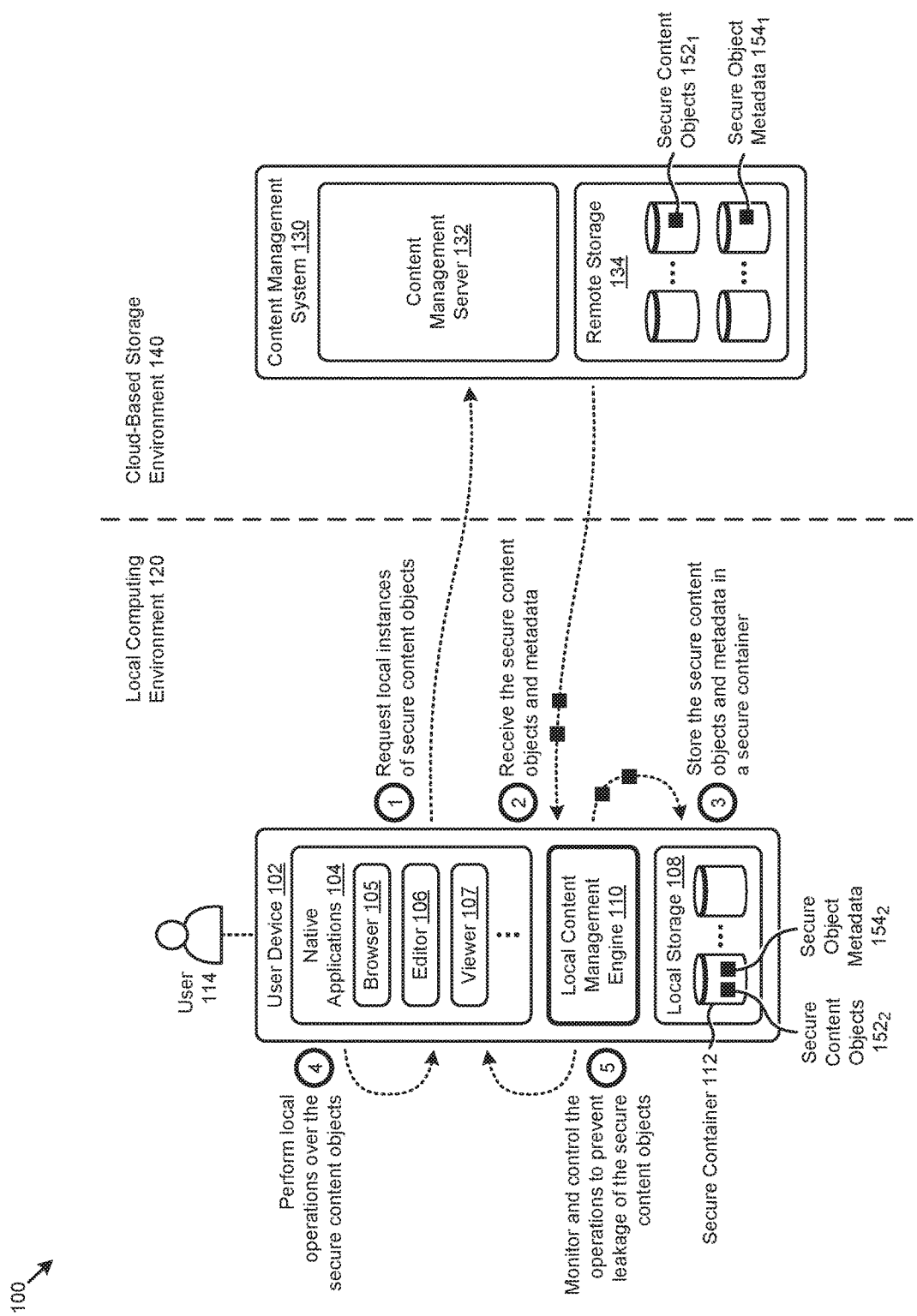
FIG. 1 illustrates a computing environment in which embodiments of the present disclosure can be implemented.

Aspects of the present disclosure solve problems associated with using computer systems for unauthorized transfer of content objects from secure areas to unsecure areas. These problems are unique to—and may have been created by— various computer-implemented methods for transferring content objects from secure areas to unsecure areas in the context of collaboration systems. Some embodiments are directed to approaches for implementing a secure container in a local computing environment to hold local instances of secure content objects. The accompanying figures and discussions herein present example environments, systems, methods, and computer program products for preventing leakage of secure content objects beyond a predefined secure area of a local computing environment.

Overview

Disclosed herein are techniques for implementing a secure container in a local computing environment to hold local instances of secure content objects. In certain embodiments, a set of secure content objects accessible by a plurality of users are managed at a content management system. Users access the secure content objects with their user devices from their respective local computing environments that are separate from the remote computing environment (e.g., cloud computing environment) of the content management system. From time to time, the users might desire to have local instances of secure content objects on their user devices. For example, the users may want to interact with the content objects using native applications on their user devices and/or the users may want to interact with the content objects while being offline (e.g., disconnected from the content management system) for certain periods of time.

When a request for a local instance of a secure content object is received, the secure content object is delivered to the local computing environment for storage in a secure container at the user device. As used herein, a secure content object is a file or folder that is associated (e.g., via a label or other metadata) with one or more security properties.

A secure container is a storage area in a file system of a user device that has one or more associated security properties such that all file data movement operations (e.g., file copy operations, file rename operations, file write operations, or any data move operation that has the potential to cause movement of data from a location within the secure container to a location other than a location within the secure container, etc.) referring to the secure container are checked with respect to the security properties. As such, any data movement operations performed over the secure content object at the user device are actively monitored (e.g., using local file system capabilities) and controlled (e.g., using logic) to prevent leakage of the secure content object to an unsecure area of the user device and/or the local computing environment. Such unsecure areas might comprise drives or folders in the native file system of the user device that are outside of the secure container. As an example, a file data movement operation that includes a write operation to write some or all of a secure content object to such an unsecure area outside of the secure container will be blocked, whereas write operations to the secure container will be allowed. In certain embodiments, the secure container is associated with a virtual file system managed at the user device. In certain embodiments, an instance of a local content management engine is provided by the remote content management system for execution on the user device so as to control movement of instances of the secure content objects into and out of the secure container.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to implementing a secure container in a local computing environment to hold local instances of secure content objects. Specifically, the figure presents a logical depiction of how the herein disclosed techniques can be implemented in a computing environment that comprises a cloud-based storage environment and multiple instances of local computing environments to prevent leakage of local instances of secure content objects in the local computing environments. A representative set of high order operations are also presented to illustrate how the herein disclosed techniques might be applied in computing environment 100.

The logical depiction of FIG. 1 illustrates a cloud-based storage environment 140 and one representative instance of a local computing environment 120. The cloud-based storage environment 140 comprises a content management system 130 that facilitates collaboration over large volumes of shared content by a plurality of users (e.g., collaborators). As can be observed, content management system 130 can comprise one or more instances of a content management server 132 that maintains the shared content in cloud-based storage environment 140.

Specifically, one or more secure content objects $152_1$ are stored in a set of remote storage 134 (e.g., remote with respect to local computing environment 120) at content management system 130 and accessed by and/or collaborated over by one or more of the users. Such secure content objects are distinguished from other content objects by various security attributes associated with the content objects. For example, a secure content object might have an associated set of permissions and/or might have an associated set of security classifications that provision access to the secure content object to only a specified set of users, whereas a nonsecure content object might be unclassified, or have permissions set to allow access by any user (e.g., publicly accessible).

A set of secure object metadata $154_1$ associated with secure content objects $152_1$ is also stored at remote storage 134. Secure object metadata $154_1$ describes certain attributes associated with secure content objects $152_1$, such as a name (e.g., file name), an object identifier, a version, characteristics of the file tree nodes, characteristics of the physical storage location, access permissions, and/or other attributes. Content management server 132 uses secure object metadata $154_1$ and/or other information to manage access and changes to secure content objects $152_1$ by the users.

Specifically, content management server 132 has the capability of managing concurrent accesses to secure content objects $152_1$ by multiple users, and can resolve editing and/or versioning conflicts that might arise from the concurrent accesses.

As illustrated in FIG. 1, a user 114 might interact with a user device 102 in local computing environment 120 to access one or more of secure content objects $152_1$. As earlier mentioned, access to secure content objects $152_1$ by user 114 requires that user device 102 is online, which is not always feasible or efficient in terms of cost and/or time. If offline or planning to be offline, user 114 might desire to have local instances of at least some of secure content objects $152_1$ at user device 102 so as to manage the content objects using the native capabilities of user device 102. Once back online, any changes made to these local instances can then be synchronized with remote instances of secure content objects $152_1$ at content management system 130. However, there are no mechanisms for preventing leakage of the local instances of secure content objects downloaded to local computing environments to an unsecure area in the local computing environments, nor for preventing the formerly secure content objects from being further leaked (e.g., distributed maliciously, distributed unwittingly, etc.) to any number of undesired and/or unintended recipients.

The herein disclosed techniques address such problems attendant to unauthorized transfer of content objects from secure areas to unsecure areas at least in part by implementing an instance of a local content management engine 110 at the respective user devices (e.g., user device 102) of the user (e.g., user 114) associated with content management system 130. In certain embodiments, the codebase that constitutes the local content management engine 110 is provided at content management system 130 and delivered (e.g., downloaded) to each of the user devices over the various local computing environments. Once installed at user device 102, local content management engine 110 establishes a secure container 112 in local computing environment 120 to securely hold local instances of secure content objects $152_1$ to prevent leakage of such local instances at local computing environment 120. More specifically, secure container 112 is established in a set of local storage 108 of user device 102 in local computing environment 120.

As can be observed in the high order operations of FIG. 1, user 114 interacts with user device 102 to issue requests to content management system 130 for local instances of secure content objects $152_1$ (operation 1). Such a request might be issued from one or more native applications 104 at user device 102. For example, a URL might be received in a browser 105 (e.g., as a link in a web-based document access portal), an editor 106 (e.g., as a link in a Word document), a viewer 107 (e.g., as a link in an Acrobat Reader document), and/or another native application (e.g., email).

The URL is then used (e.g., clicked) to issue a request (e.g., HTTP request) from user device 102 to content management system 130 to download a particular content object. Content management system 130 responds to the request at least in part by delivering to user device 102 instances of secure content objects 152$_1$ and associated instances of secure object metadata 154$_1$ (operation 2). The instances of secure content objects 152$_1$ and secure object metadata 154$_1$ are received by local content management engine 110 and stored in secure container 112 (operation 3).

As a result of the foregoing operation, local instances of secure content objects 152$_2$ and secure object metadata 154$_2$ are securely stored in local storage 108 at user device 102. In some cases, such when a secure content object comprises one or more embedded content objects (e.g., a Word document with an embedded Excel workbook), a plurality of content objects and sets of object metadata might be delivered by content management system 130 for receipt by local content management engine 110 and stored in secure container 112.

In the embodiment shown in FIG. 1, any of the native applications 104 might be used to perform operations over secure content objects 152$_2$ in local computing environment (operation 4). The particular native application (e.g., editor 106 and/or viewer 107) might be selected based at least in part on the file type of the secure content object specified in the environment variables of the operating system of user device 102. When secure content objects 152$_2$ are locally available at user device 102, such manipulation by native applications 104 can occur regardless of whether or not the user device 102 is online. As such, the local instances of secure content objects 152$_2$ might be edited by user 114 while user device 102 is offline, and the remote instances of the secure content object 152$_1$ and/or other locally-stored instances of secure content objects might be concurrently edited by other users. In this case, when user device 102 is back online, the local content management engine 110 facilitates a synchronization of the local and remote instances of secure content objects and/or secure object metadata.

The operations performed over secure content objects 152$_2$ can involve data movement operations, such as write operations, that intentionally or unintentionally attempt to save some or all of secure content objects 152$_2$ and/or secure object metadata 154$_2$ to an area in local storage 108 that is outside of secure container 112. As merely one example, editor 106 (e.g., Microsoft Word) might be used to save (e.g., using a "Save As . . . " operation) a secure content object in local computing environment 120 to a location in the native file system of user device 102 that is not within secure container 112. The herein disclosed techniques prevent the leakage of secure content objects 152$_2$ and/or secure object metadata 154$_2$ into unsecure storage areas of local computing environment 120 at least in part by monitoring and controlling such operations over all of the data (e.g., content objects, metadata, etc.) stored in secure container 112 (operation 5). Specifically, any write operation requests pertaining to secure content objects from secure container 112 are intercepted by local content management engine 110 and will be allowed if the target storage location of a requested write operation is within secure container 112 but will be blocked if the target storage location of the requested write operation is not within secure container 112.

The aforementioned capabilities facilitated by the herein disclosed techniques result in improvements in computer functionality that serve to reduce the demand for computer processing power, reduce the demand for computer memory and data storage, reduce network bandwidth use, and reduce the demand for intercomponent communication in computing environments. Specifically, applications of the herein disclosed techniques reduce the consumption of computing, storage, and networking resources by eliminating the need for other multi-environment data security approaches—such as digital rights management (DRM) approaches or data loss prevention (DLP) approaches—which approaches can consume significant levels of resources at both the cloud-based storage environment as well as at the local computing environments.

One embodiment of the herein disclosed techniques for preventing secure content leakage is disclosed in further detail as follows.

Figure 2:
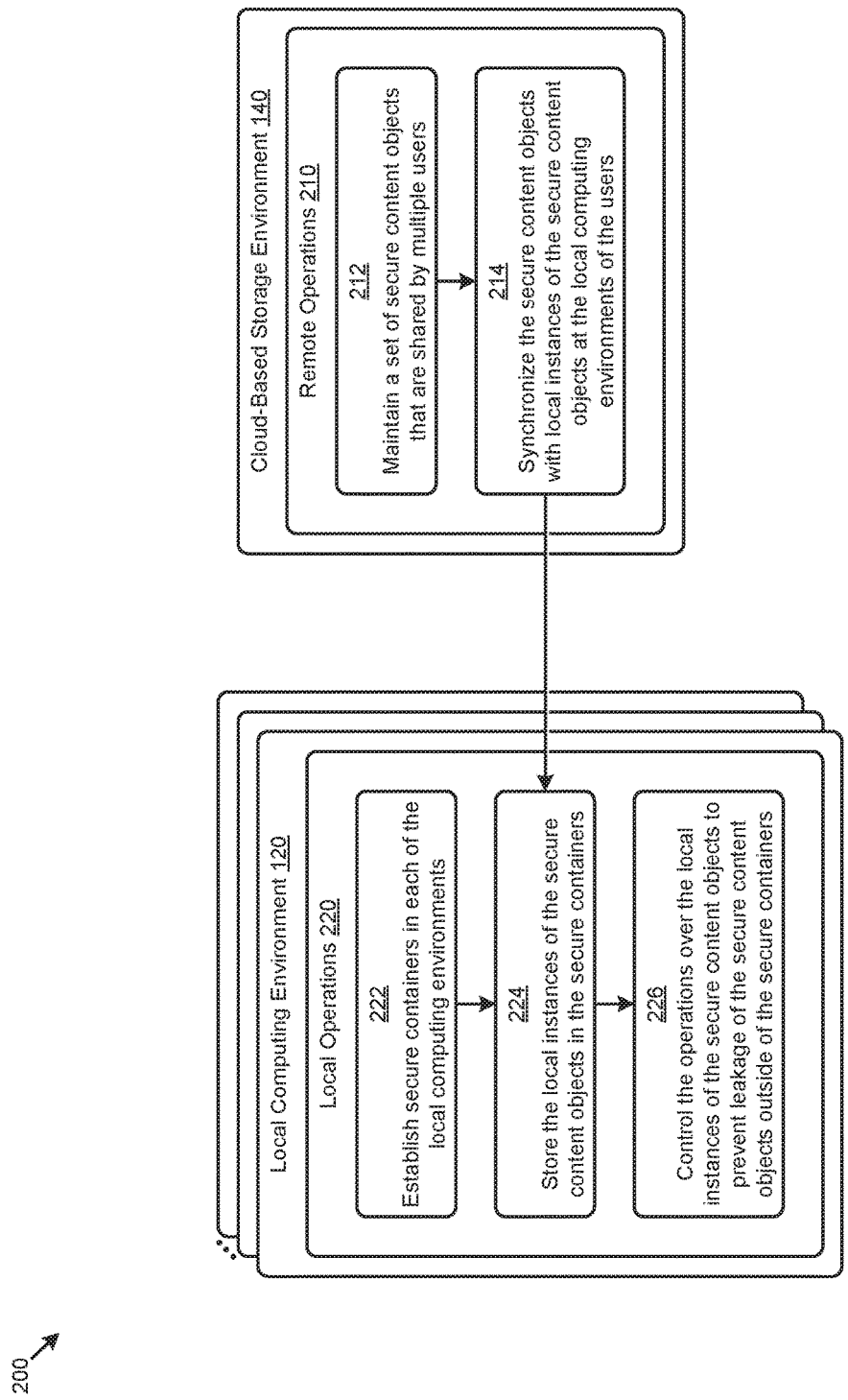
FIG. 2 depicts a secure content leakage prevention technique as implemented in systems that prevent leakage of secure content objects beyond a predefined secure area of a local computing environment, according to an embodiment.

FIG. 2 depicts a secure content leakage prevention technique 200 as implemented in systems that prevent leakage of secure content objects beyond a predefined secure area of a local computing environment. As an option, one or more variations of secure content leakage prevention technique 200 or any aspect thereof may be implemented in the context of the architecture and functionality of the embodiments described herein. The secure content leakage prevention technique 200 or any aspect thereof may be implemented in any environment.

FIG. 2 illustrates aspects pertaining to implementing a secure container in a local computing environment to hold local instances of secure content objects. Specifically, the figure is presented to illustrate one embodiment of certain steps and/or operations that implement secure containers in respective instances of multiple local computing environments that are coupled to a cloud-based storage environment to facilitate collaboration over various instances of secure content objects. As can be observed, portions of the steps and/or operations can be grouped into a set of remote operations 210 performed at cloud-based storage environment 140 and a set of local operations 220 performed at any of the local computing environments (e.g., local computing environment 120).

The remote operations 210 of secure content leakage prevention technique 200 commence by maintaining a set of secure content objects that are shared by multiple users (step 212). As an example, secure content objects and associated secure object metadata might be maintained by a content management system on behalf of an enterprise and shared by the users (e.g., employees) associated with the enterprise to facilitate collaboration over the secure content objects. To facilitate such sharing and/or collaboration, the secure content objects are synchronized with local instances of the secure content objects that are being accessed at the local computing environments (e.g., local computing environment 120) of the users (step 214). As earlier mentioned, such synchronization capabilities allow, for example, the users to view, edit and/or otherwise interact with the secure content objects when offline (e.g., when local computing environment 120 is decoupled from cloud-based storage environment 140).

According to local operations 220 at local computing environment 120, unauthorized leakage or transfer of secure content objects in the local environments is prevented by establishing secure containers in each of the local computing environments (step 222). Such secure containers can be established over one or more storage facilities in the local computing environments to store local instances of secure content objects (step 224).

For example, a secure content object downloaded to a user device in local computing environment 120 will be stored in a secure container established at the user device and remain securely stored in the secure container until the local instance is removed (e.g., deleted) from the local computing environment. Specifically, while the local instances of secure content objects are stored in the secure containers in the local computing environments, any operations over the local instances are controlled to prevent leakage of secure content objects and/or any respective secure object metadata outside of the secure containers (step 226). As an example, write operation requests associated with the local instances of secure content objects are controlled (e.g., allowed or denied) based at least in part on the target storage location (e.g., within a secure container or outside of a secure container) that corresponds to the request.

One embodiment of a system, data flows, and data structures for implementing the secure content leakage prevention technique 200 and/or other herein disclosed techniques is disclosed infra. Moreover, additional techniques for maintaining secure content objects in a content management system are described in U.S. Pat. No. 10,243,953, titled "SYSTEMS AND METHODS FOR SECURE RESOURCE ACCESS AND NETWORK COMMUNICATION", issued on Mar. 26, 2019, which is hereby incorporated by reference in its entirety.

Figure 3:
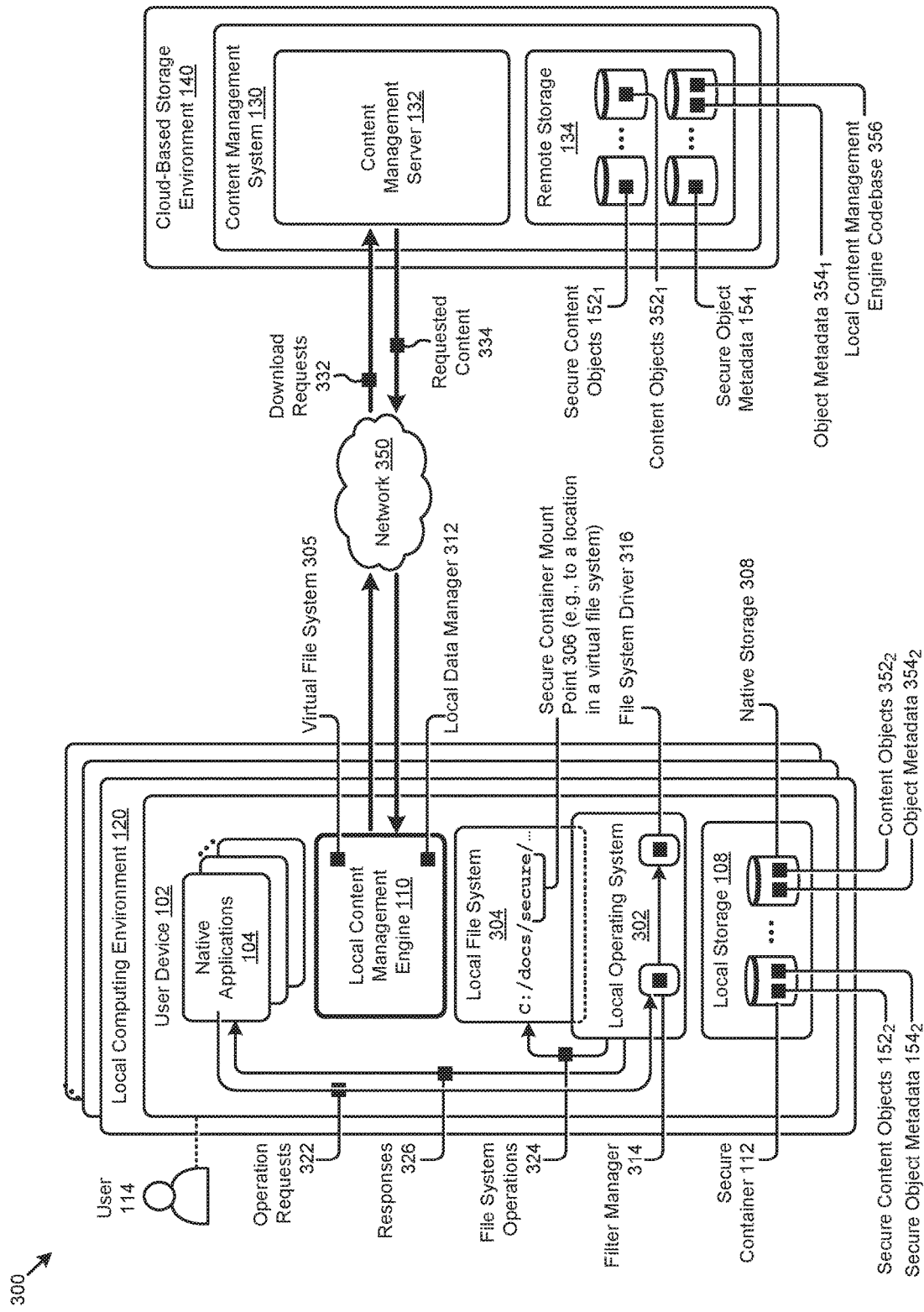
FIG. 3 presents a diagram of a system that prevents leakage of secure content objects beyond a predefined secure area of a local computing environment, according to an embodiment.

FIG. 3 presents a diagram of a system 300 that prevents leakage of secure content objects beyond a predefined secure area of a local computing environment. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to implementing a secure container in a local computing environment to hold local instances of secure content objects. Specifically, the figure is being presented to show one embodiment of certain representative system components and associated data flows and structures that describes how the herein disclosed techniques might be implemented in a computing environment that comprises a cloud-based storage environment 140 and one or more instances of a local computing environment 120. The components, data flows, and data structures shown in FIG. 3 present one partitioning and associated data manipulation approach. The specific example shown is purely exemplary, and other subsystems, data structures, and/or partitioning are reasonable.

As shown, system 300 comprises several components earlier described. Specifically shown are user device 102 accessed by user 114 in local computing environment 120 and content management system 130 in cloud-based storage environment 140. User device 102, user 114, and local computing environment 120 represent a plurality of user devices and corresponding users and local computing environments that might be associated with a particular remote (e.g., cloud-based) content management system and storage environment. As earlier described, the content management system 130 comprises one or more instances of a content management server 132 that maintain various instances of content objects and associated object metadata stored in a set of remote storage 134.

As can be observed, content management server 132 maintains a set of secure content objects $152_1$ and an associated set of secure object metadata $154_1$. Such secure content objects and metadata are to be controlled so as to prevent leakage of content objects and/or metadata in cloud-based storage environment 140 and/or any of the local computing environments. Content management server 132 also maintains a set of content objects $352_1$ and an associated set of object metadata $354_1$ that do not have the security restrictions of secure content objects $152_1$ and secure object metadata $154_1$. For example, content objects $352_1$ might be public documents that can be distributed without restriction.

A local content management engine codebase 356 is also stored in remote storage 134. Local content management engine codebase 356 is developed by the provider of content management system 130 to provide the capabilities of a local content management engine to the users of the system. Specifically, one of a plurality of download requests 332 can be issued from user device 102 to content management server 132 through network 350 so as to download an instance of local content management engine codebase 356. In response to the download request, content management server 132 delivers an instance of local content management engine codebase 356 in an instance of requested content 334 for installation at user device 102, thereby establishing the local content management engine 110 at user device 102.

In certain embodiments, a secure container 112 is established in local storage 108 of user device 102 upon installation of local content management engine 110. As shown, secure container 112 is mounted at a secure container mount point 306 of a local file system 304 associated with a local operating system 302 at user device 102. Secure container mount point 306 can facilitate referencing the secure container 112 by, for example, a local file system browser (e.g., file system explorer) and/or another file system navigation mechanism. Any portion (e.g., unsecure storage) of local storage 108 outside of secure container 112 is represented by a set of native storage 308.

Among other capabilities, local content management engine 110 facilitates user interactions with remote instances of secure content objects $152_1$ and content objects $352_1$ by user 114 in local computing environment 120. Local content management engine 110 also facilitates the download of local instances of secure content objects $152_1$ and content objects $352_1$ to local computing environment 120. Specifically, instances of download requests 332 are issued from local content management engine 110 at user device 102 to content management server 132 so as to download various instances of secure content objects $152_1$ and content objects $352_1$. In response to download requests 332, content management server 132 delivers instances of requested content 334 that comprise the requested content objects and associated metadata. As can be observed, instances of secure content objects $152_2$ and secure object metadata $154_2$ received by local content management engine 110 are stored in secure container 112 in local storage 108. Other content (e.g., nonsecure and/or public content) received by local content management engine 110, such as content objects $352_2$ and object metadata $354_2$, are stored in native storage 308.

Any of a plurality of native applications 104 operating at user device 102 might be used to perform operations over secure content objects $152_2$ or content objects $352_2$ in local computing environment 120. As earlier mentioned, local content management engine 110 facilitates a synchronization of any changes to the local and remote instances of secure content objects and/or other content objects and/or the metadata associated with such objects. Moreover, local content management engine 110 facilitates the prevention of leakage of secure content objects $152_2$ or secure object metadata $154_2$ outside of secure container 112.

Specifically, local content management engine 110 monitors the instances of operation requests 322 issued by native applications 104 to local operating system 302. The operation requests 322 are analyzed by local content management engine 110 to determine one or more responses 326 to issue to native applications 104 and/or one or more file system operations 324 to execute in response to the operation requests 322. For example, a first operation request associated with a secure content object might invoke a response that allows a write operation to secure container 112, whereas a second operation request associated with the secure content object might invoke a response that blocks the write request.

As can be observed in the embodiment of FIG. 3, a local data manager 312 is implemented (e.g., as a MICROSOFT WINDOWS minifilter interface) in local content management engine 110 to interact with a filter manager 314 associated with local operating system 302 (e.g., a MICROSOFT WINDOWS operating system, an IOS operating system, an ANDROID operating system, a LINUX operating system, etc.). Specifically, local data manager 312 is registered to facilitate processing of user interactions that raise any number of instances of operation requests 322 associated with secure content objects $152_2$ or content objects $352_2$. In such cases, operation requests 322 are caused by user interactions. Operation requests 322 are then issued to local operating system 302, which operation requests are intercepted by filter manager 314. The filter manager then calls the local data manager 312 to process (e.g., filter) the requests. The decision to allow, block or otherwise respond to operation requests 322 is determined at local data manager 312 (e.g., using a pre-operation callback routine). Local data manager 312 also facilitates the issuing of responses 326 to the requestors (e.g., native applications 104) that had processed the user interactions corresponding to the operation requests 322.

As used herein, a filter manager is any portion of executable that is configured to receive a file system command and reroute that file system command to another portion of executable code without performing the actions as specified in the file system command. In some implementations a filter manager processes rules to allow or deny performance of the actions (operation requests 322) as specified in the file system command.

If any of operation requests 322 are allowed, filter manager 314 calls a file system driver 316 to execute file system operations 324 at local file system 304. As an example, an allowed write operation request associated with one of the secure content objects $152_2$ might result in a write operation being performed at a subdirectory of secure container mount point 306, which mount point refers to a storage area in local file system 304, or which mount point refers to a storage area that is managed by a virtual file system 305. In various embodiments such as are depicted in FIG. 3, all or part of a virtual file system 305 is implemented within the local content management engine 110. In some embodiments, local data manager 312 implements functions of, or interfaces with virtual file system 305 (as shown). In some embodiments, local data manager 312 is a component of virtual file system 305. As used herein, a virtual file system is a component that is interfaced to a native file system such that file operations are received and processed before passing any aspects of the file operations to the native file system. A virtual file system may provide a file viewer that allows a user to view files, folders and other stored objects that are managed by the virtual file system. In some cases Further details regarding approaches to implementing a virtual file system in a local content management engine are described in U.S. application Ser. No. 15/140,179 titled "VIRTUAL FILE SYSTEM FOR CLOUD-BASED SHARED CONTENT", filed on Apr. 27, 2016, which is hereby incorporated by reference in its entirety.

The foregoing discussions include techniques for establishing a secure container in a local computing environment (e.g., step 222 of FIG. 2), which techniques are disclosed in further detail as follows.

Figure 4:
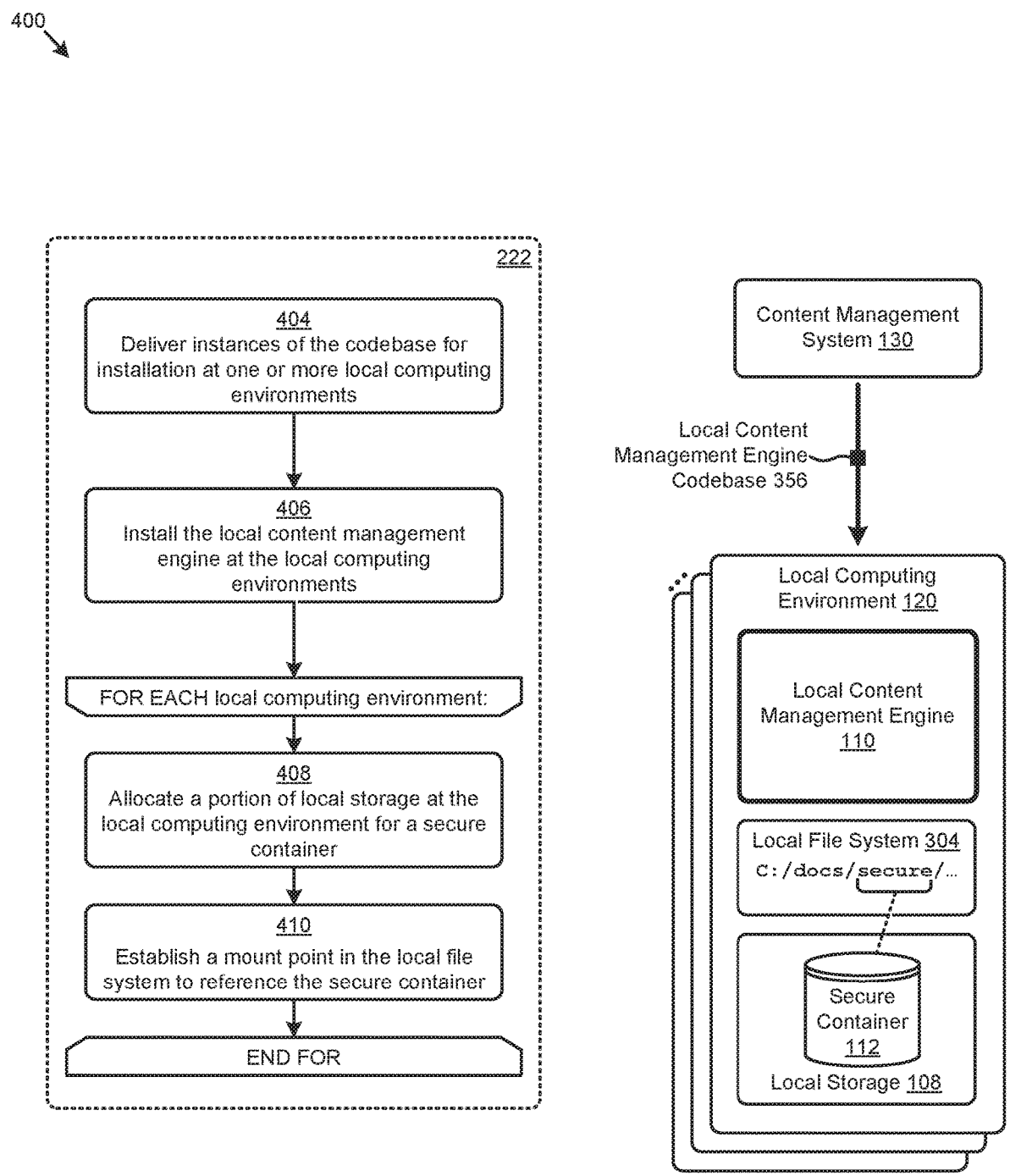
FIG. 4 depicts a secure container setup technique as implemented in systems that prevent leakage of secure content objects beyond a predefined secure area of a local computing environment, according to an embodiment.

FIG. 4 depicts a secure container setup technique 400 as implemented in systems that prevent leakage of secure content objects beyond a predefined secure area of a local computing environment. As an option, one or more variations of secure container setup technique 400 or any aspect thereof may be implemented in the context of the architecture and functionality of the embodiments described herein. The secure container setup technique 400 or any aspect thereof may be implemented in any environment.

FIG. 4 illustrates aspects pertaining to implementing a secure container in a local computing environment to hold local instances of secure content objects. Specifically, the figure is presented to illustrate one embodiment of certain steps and/or operations for establishing secure containers in local computing environments. As depicted in the figure, the steps and/or operations are associated with step 222 of FIG. 2. A representative scenario is also shown in the figure to illustrate an example application of secure container setup technique 400.

Secure container setup technique 400 commences by developing a codebase that constitutes (e.g., facilitates the capabilities of) a local content management engine as described herein. Instances of the executable code are delivered for installation at one or more local computing environments (step 404) and then installed as local content management engines in the respective local computing environments (step 406). For example, a user (e.g., collaborator) associated with local computing environment 120 might take some action (e.g., click a "Download Now" button on a user device) to download an instance of local content management engine codebase 356 from content management system 130 for installation as local content management engine 110 in local computing environment 120.

In response to the installation of a local content management engine at each local computing environment, a portion of the local storage in the local computing environment is allocated to serve as a secure container (step 408). For example, a portion of local storage 108 in local computing environment 120 might be configured as a database that serves as secure container 112. A mount point in the local file system is then established to facilitate referencing of the secure container (step 410). As can be observed, a mount point at "C:/docs/secure/" might established in local file system 304 of local computing environment 120 and attached to secure container 112.

The foregoing discussions include techniques for storing local instances of secure content objects in the aforementioned secure containers (e.g., step 224 of FIG. 2), which techniques are disclosed in further detail as follows.

Figure 5:
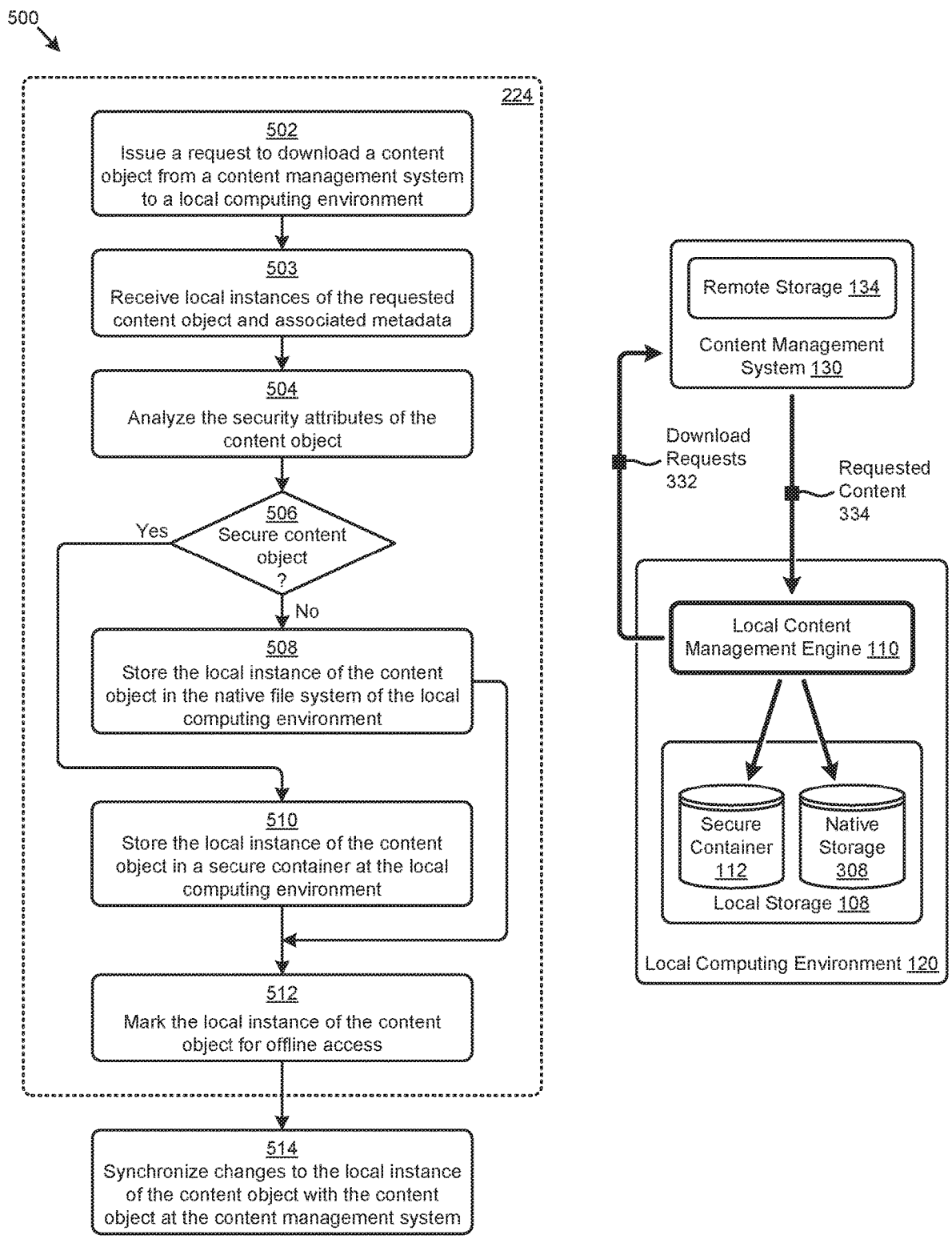
FIG. 5 presents a secure content object download technique as implemented in systems that prevent leakage of secure content objects beyond a predefined secure area of a local computing environment, according to an embodiment.

FIG. 5 presents a secure content object download technique 500 as implemented in systems that prevent leakage of secure content objects beyond a predefined secure area of a local computing environment. As an option, one or more variations of secure content object download technique 500 or any aspect thereof may be implemented in the context of the architecture and functionality of the embodiments described herein. The secure content object download technique 500 or any aspect thereof may be implemented in any environment.

FIG. 5 illustrates aspects pertaining to implementing a secure container in a local computing environment to hold local instances of secure content objects. Specifically, the figure is presented to illustrate one embodiment of certain steps and/or operations for downloading and storing local instances of secure content objects in the secure containers and downloading and storing local instances of other content objects (e.g., nonsecure or public content objects) outside of the secure containers. As depicted in the figure, at least a portion of the steps and/or operations are associated with step 224 of FIG. 2. A representative scenario is also shown in the figure to illustrate an example application of secure content object download technique 500.

Secure content object download technique 500 commences by issuing a request to download a content object from a content management system to a local computing environment (step 502). Such a request might be one of a plurality of download requests 332 issued by local content management engine 110 at local computing environment 120 to content management system 130 for a content object maintained in remote storage 134 by the system. In response to the download request, local instances of the requested content object and associated object metadata are received (step 503). For example, local content management engine 110 receives instances of requested content 334 (e.g., content objects and metadata) in response to various instances of download requests 332 issued from local computing environment 120. The security attributes of the content object received at the local computing environment are analyzed (step 504) so as to, for example, determine if the requested and received content object is a secure content object or not a secure content object. In some cases, object metadata associated with the content object is consulted to determine the security attributes (e.g., permissions, etc.) of the content object.

If the security attributes indicate the content object is not a secure content object ("No" path of decision 506), then the local instance of the content object is stored in the native file system of the local computing environment (step 508). If the security attributes indicate the content object is a secure content object ("Yes" path of decision 506), then the local instance of the content object is stored in a secure container established at the local computing environment (step 510). As illustrated in the figure, local content management engine 110 directs non-secure local instances of requested content 334 to native storage 308 in local storage 108 at local computing environment 120, and directs secure local instances of requested content 334 to secure container 112 in local storage 108 at local computing environment 120.

Whether a content object is determined to be a secure content object or a non-secure content object, the content object is marked for offline access (step 512). Such marking of the local instance of a content object facilitates a synchronization of any changes to the local instance of the content object with the instance of the content object maintained at the content management system (step 514).

The foregoing discussions include techniques for monitoring and controlling the operations over local instances of secure content objects stored in local computing environments to prevent leakage of the secure content objects (e.g., step 226 of FIG. 2), which techniques are disclosed in further detail as follows.

Figure 6:
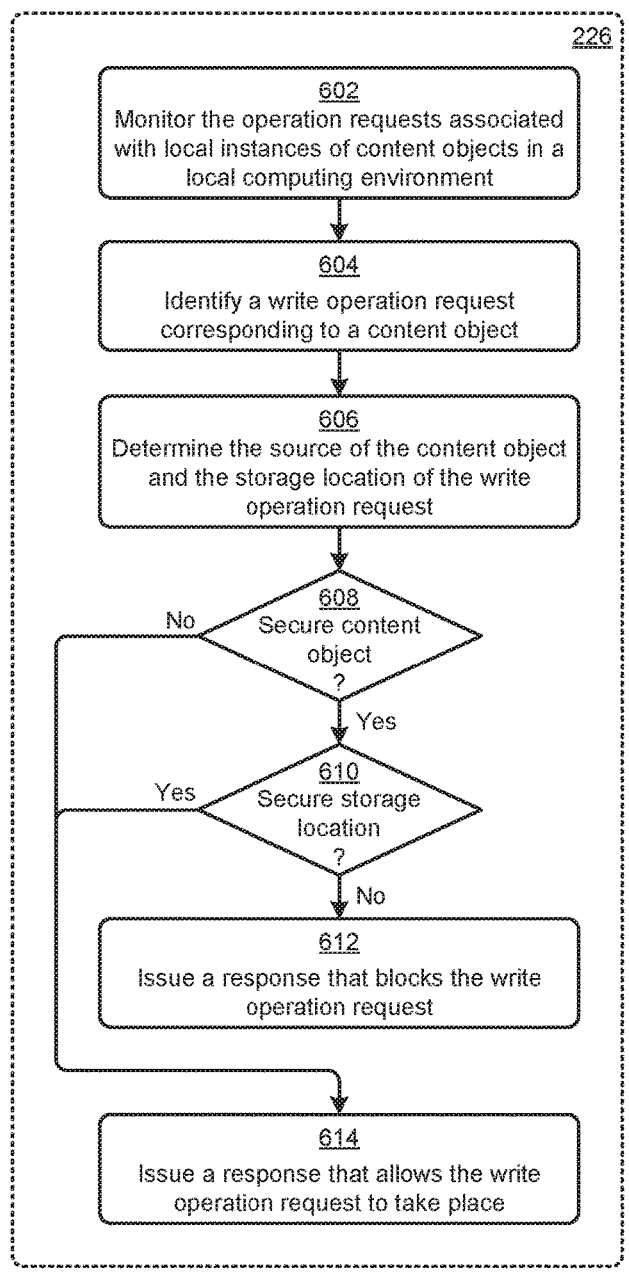
FIG. 6 presents a local content object management technique as implemented in systems that prevent leakage of secure content objects beyond a predefined secure area of a local computing environment, according to an embodiment.
Figure 6:
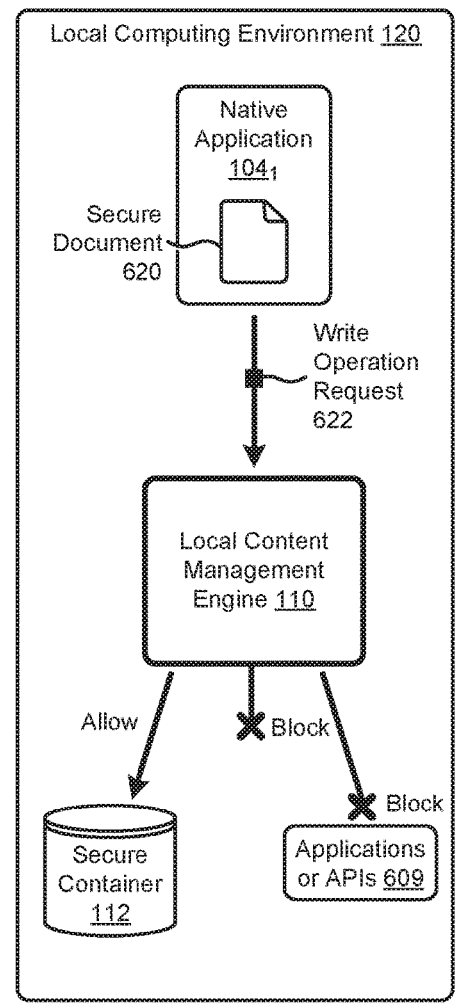

FIG. 6 presents a local content object management technique 600 as implemented in systems that prevent leakage of secure content objects beyond a predefined secure area of a local computing environment. As an option, one or more variations of local content object management technique 600 or any aspect thereof may be implemented in the context of the architecture and functionality of the embodiments described herein. The local content object management technique 600 or any aspect thereof may be implemented in any environment.

FIG. 6 illustrates aspects pertaining to implementing secure containers in local computing environments to hold local instances of secure content objects. Specifically, the figure is presented to illustrate one embodiment of certain steps and/or operations for monitoring and controlling the operations over the local instances of secure content objects to prevent leakage of the secure content objects outside of the secure containers. As depicted in the figure, the steps and/or operations are associated with step 226 of FIG. 2. A representative scenario is also shown in the figure to illustrate an example application of local content object management technique 600.

Local content object management technique 600 commences by monitoring the operation requests associated with local instances of content objects in a local computing environment (step 602). As shown, local content management engine 110 might monitor all operation requests associated with the content object stored in local storage 108 of local computing environment 120. While monitoring such operation requests, a write operation request associated with a particular content object might be identified (step 604). For example, a native application $104_1$ in local computing environment 120 might have access to a secure content object, such as secure document 620, and issue a write operation request 622 associated with secure document 620 that is detected by local content management engine 110.

In response to identifying the write operation, the then-current storage location of the content object and the target storage location of the write operation request are determined (step 606). As an example, upon identifying the write operation request 622, local content management engine 110 might consult the metadata associated with secure document 620 to determine the then-current storage location of secure document 620. Local content management engine 110 might further analyze the parameters of write operation request 622 to determine the target storage location. If the then-current storage location indicates the content object is a secure content object ("Yes" path of decision 608) and the target storage location is not a secure storage location ("No" path of decision 610), then a response is issued that blocks the write operation request (step 612). In some cases, and as shown, if a target storage location refers to an application or an application programming interface entry point (API entry point), then a response is issued that blocks the write operation request (step 612). As examples, if the then-current storage location of secure document 620 is within secure container 112 but the target storage location of the write operation request is destined for non-secure locations of native storage 308 or a non-secure location at or via an application or API 609, then the write operation request is blocked. The foregoing non-secure locations of native storage might be a universal serial bus drive (USB drive) or other external storage location(s) that are not within secure container 112. The foregoing non-secure locations of native storage might be a memory location that is not within secure container 112.

If the then-current storage location indicates the content object is not a secure content object ("No" path of decision 608), then a response is issued that allows the write operation request to take place (step 614). Moreover, if the then-current storage location indicates the content object is a secure content object ("Yes" path of decision 608) and the target storage location is a secure storage location ("Yes" path of decision 610), then a response is issued that allows the write operation request to take place (step 614). As an example, if the then-current storage location of secure document 620 is within secure container 112 and the target storage location of the write operation request is also within secure container 112, the write operation request is allowed.

ADDITIONAL EMBODIMENTS OF THE DISCLOSURE

Additional Practical Application Examples

Figure 7:
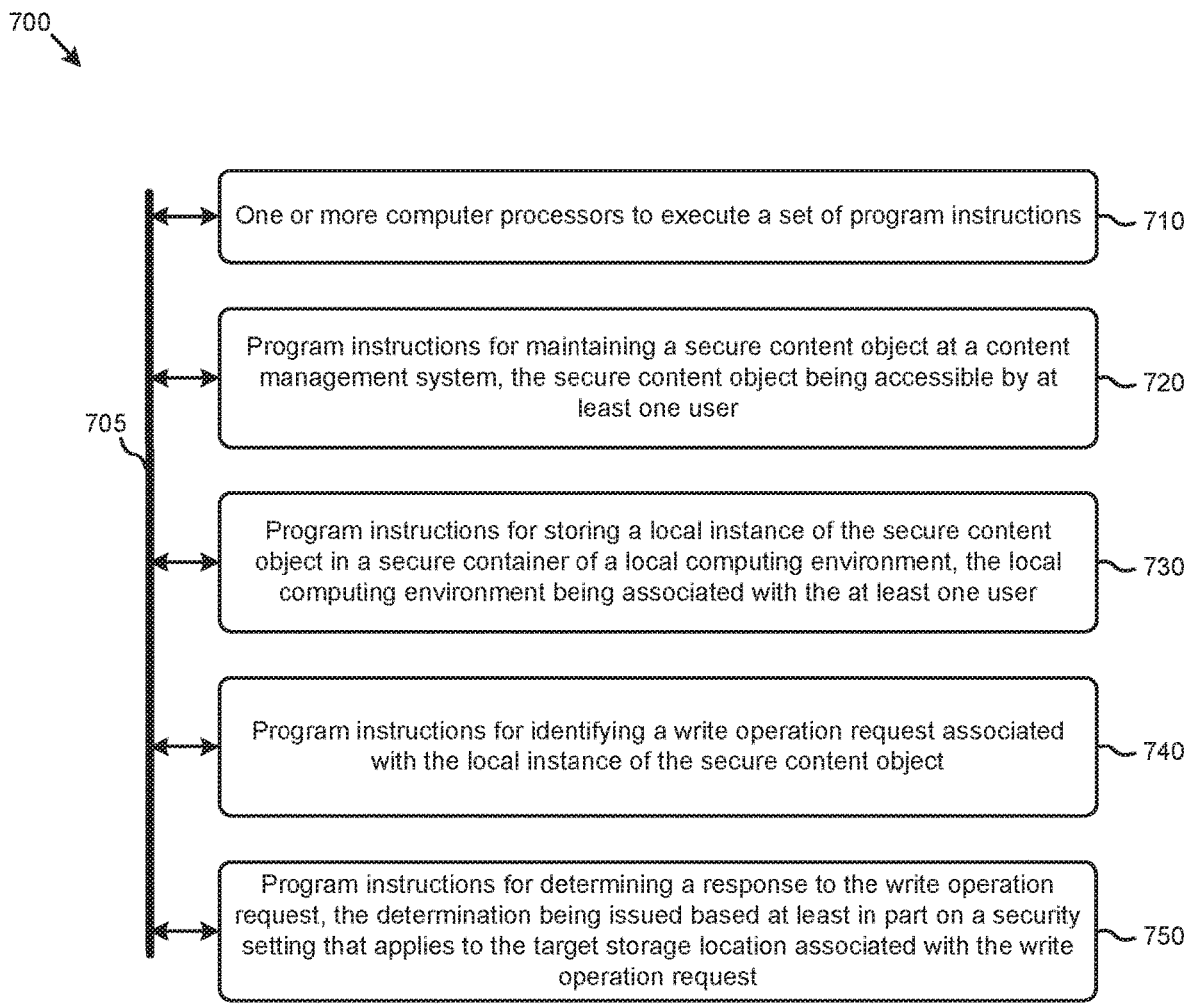
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually or as combined, serve to form improved technological processes that address unauthorized transfer of content objects from secure areas to unsecure areas. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with any other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: maintaining a secure content object at a content management system, the secure content object being accessible by at least one user (module 720); storing a local instance of the secure content object in a secure container of a local computing environment, the local computing environment being associated with the at least one user (module 730); identifying a write operation request such as a write operation from a native application that is running in the local computing environment, which write operation request is associated with the local instance of the secure content object (module 740); and determining a response to the write operation request, the determination being issued based at least in part on a security setting that applies to the target storage location associated with the write operation request (module 750).

Variations of the foregoing may include more or fewer of the shown modules. Certain variations may perform more or fewer (or different) steps and/or certain variations may use data elements in more, or in fewer, or in different operations.

System Architecture Overview

Additional System Architecture Examples

Figure 8A:
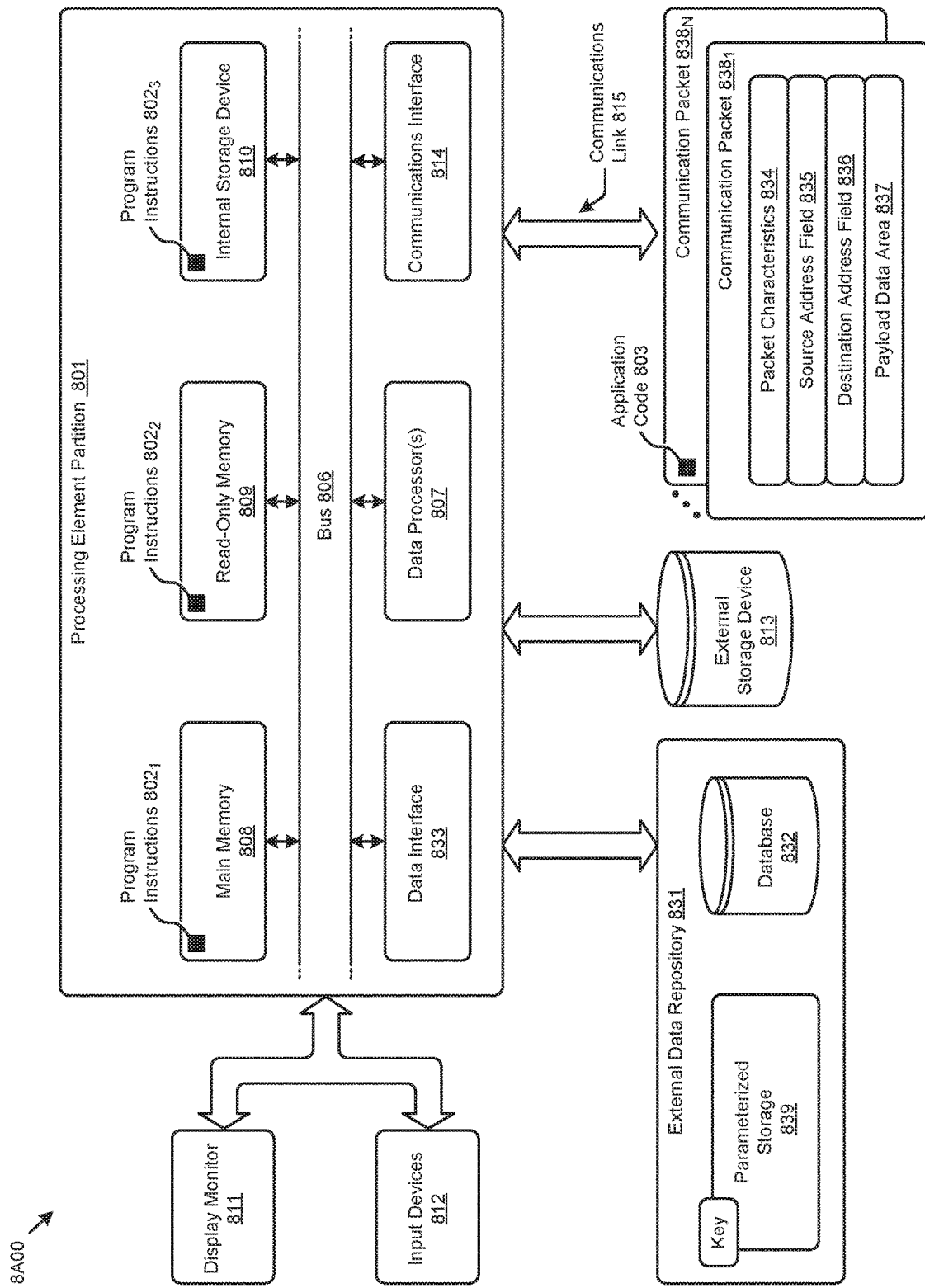
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program instructions may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to preventing leakage of secure content objects beyond a predefined secure area of a local computing environment. A module may include one or more state machines and/or combinational logic used to implement or facilitate the operational and/or performance characteristics in systems that prevent leakage of secure content objects beyond a predefined secure area of a local computing environment.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of preventing leakage of secure content objects beyond a predefined secure area of a local computing environment). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations that prevent leakage of secure content objects beyond a predefined secure area of a local computing environment, and/or for improving the way data is manipulated when performing computerized operations pertaining to implementing a secure container in a local computing environment.

Figure 8B:
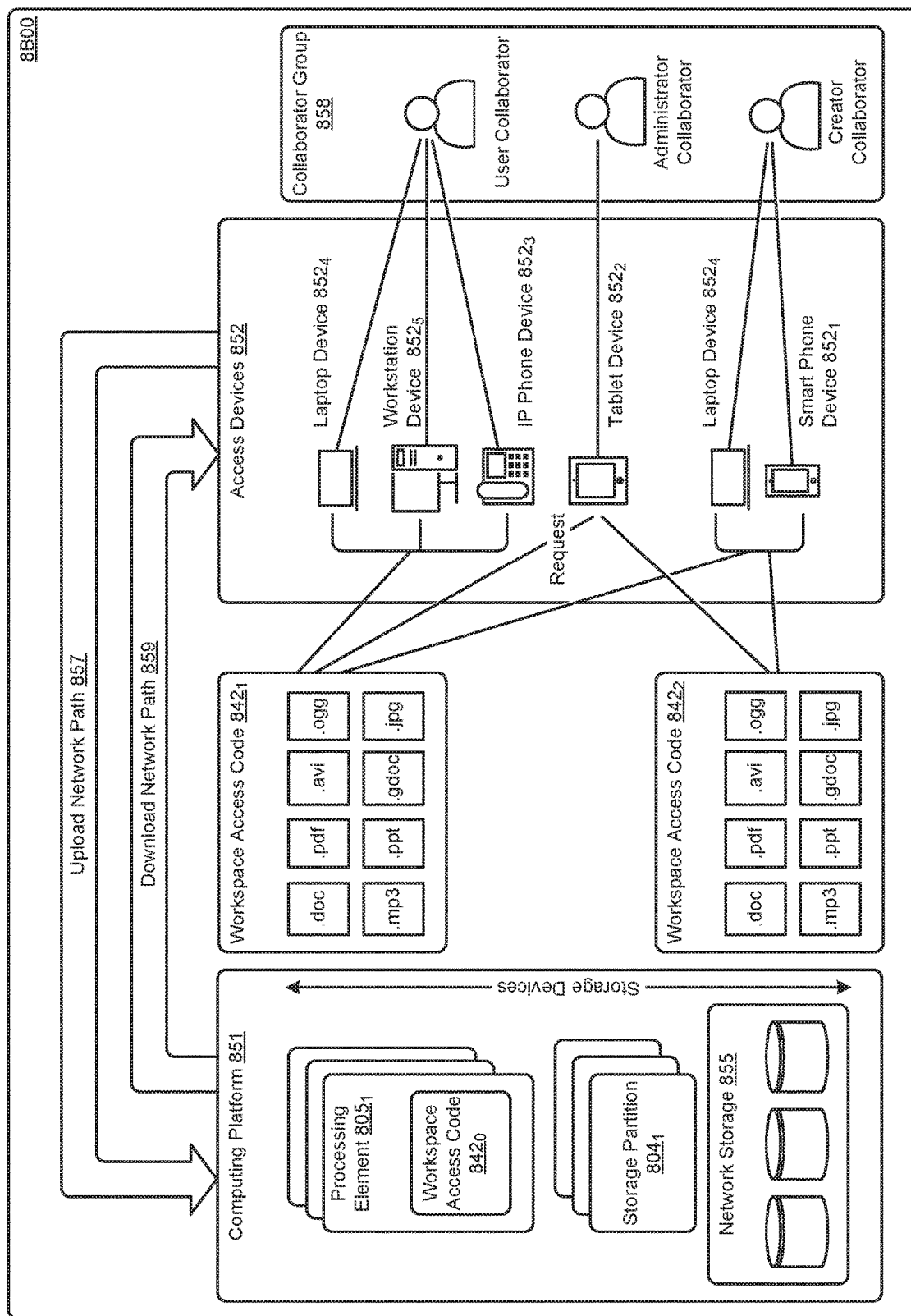

FIG. 8B depicts a block diagram of an instance of a cloud-based environment 8B00. Such a cloud-based environment supports access to workspaces through the execution of workspace access code (e.g., workspace access code 842$_0$, workspace access code 842$_1$, and workspace access code 842$_2$). Workspace access code can be executed on any of access devices 852 (e.g., laptop device 852$_4$, workstation device 852$_5$, IP phone device 852$_3$, tablet device 852$_2$, smart phone device 852$_1$, etc.), and can be configured to access any type of object. Strictly as examples, such objects can be folders or directories or can be files of any filetype. A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element 805$_1$). The workspace access code can interface with storage devices such as networked storage 855. Storage of workspaces and/or any constituent files or objects, and/or any other code or scripts or data can be stored in any one or more storage partitions (e.g., storage partition 804$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for content leakage prevention, the method comprising:
    maintaining a secure content object at a content management system, the secure content object being accessible by at least one user;
    mounting a secure container at a mount point on a local file system of a local computing environment to facilitate referencing the secure container; and
    responding to a request to download the secure content object at the local computing environment by:
        storing a local instance of the secure content object in the secure container mounted on the local file system of the local computing environment, the local computing environment being associated with the at least one user, wherein the local instance of the secure content object is downloaded from the content management system,
        identifying a data movement operation request associated with the local instance of the secure content object, and
        denying the data movement operation request when a target storage location associated with the data movement operation request is other than a location in the secure container.

2. The method of claim 1, wherein the data movement operation request is allowed when the target storage location corresponds to the secure container.

3. The method of claim 1, wherein a data movement operation comprises one or more of, file copy operations, file rename operations, or a write operation.

4. The method of claim 1, wherein the secure container is associated with a virtual file system of the local computing environment.

5. The method of claim 1, wherein the data movement operation request is caused by user interactions with a local operating system at the local computing environment.

6. The method of claim 5, wherein interacting with the local operating system comprises interacting with a filter manager at the local operating system.

7. The method of claim 5, wherein the local operating system is one of, MICROSOFT WINDOWS, a LINUX operating system, an IOS operating system or an ANDROID operating system.

8. The method of claim 1, wherein the secure container is a database stored in local storage at the local computing environment.

9. The method of claim 1, wherein one or more changes to the local instance of the secure content object are synchronized with the secure content object maintained at the content management system.

10. The method of claim 1, wherein the data movement operation request is blocked when the target storage location corresponds to a USB drive, or an application programming interface entry point that refers to a location other than the secure container.

11. A non-transitory computer readable medium having stored thereon a sequence of instructions which, when stored in memory and executed by one or more processors causes the one or more processors to perform a set of acts for content leakage prevention, the set of acts comprising:
    maintaining a secure content object at a content management system, the secure content object being accessible by at least one user;
    mounting a secure container at a mount point on a local file system of a local computing environment to facilitate referencing the secure container; and
    responding to a request to download the secure content object at local computing environment by:
        storing a local instance of the secure content object in the secure container mounted on the local file system of the local computing environment, the local computing environment being associated with the at least one user, wherein the local instance of the secure content object is downloaded from the content management system,
        identifying a data movement operation request associated with the local instance of the secure content object, and
        denying the data movement operation request when a target storage location associated with the data movement operation request is other than a location in the secure container.

12. The non-transitory computer readable medium of claim 11, wherein the data movement operation request is allowed when the target storage location corresponds to the secure container.

13. The non-transitory computer readable medium of claim 11, wherein the mount point is referenced in a local file system browser.

14. The non-transitory computer readable medium of claim 11, wherein the secure container is associated with a virtual file system of the local computing environment.

15. The non-transitory computer readable medium of claim 11, wherein the data movement operation request is caused by user interactions with a local operating system at the local computing environment.

16. A system for content leakage prevention, the system comprising:
    a non-transitory computer readable medium having stored thereon a sequence of instructions; and
    one or more processors that execute the sequence of instructions to cause the one or more processors to perform a set of acts, the set of acts comprising,
        maintaining a secure content object at a content management system, the secure content object being accessible by at least one user;
        mounting a secure container at a mount point on a local file system of a local computing environment to facilitate referencing the secure container; and responding to a request to download the secure content object at the local computing environment by:
  storing a local instance of the secure content object in the secure container mounted on the local file system of the local computing environment, the local computing environment being associated with the at least one user, wherein the local instance of the secure content object is downloaded from the content management system,
  identifying a data movement operation request associated with the local instance of the secure content object, and
  denying the data movement operation request when a target storage location associated with the data movement operation request is other than a location in the secure container.

17. The system of claim 16, wherein the data movement operation request is allowed when the target storage location corresponds to the secure container.

* * * * *